United States Patent [19]

Bower et al.

[11] 4,188,661

[45] Feb. 12, 1980

[54] DIRECT DRIVE BALLAST WITH STARTING CIRCUIT

[75] Inventors: Bruce L. Bower, Williamsport; Raymond H. Kohler, Montoursville, both of Pa.

[73] Assignee: GTE Sylvania Incorporated, Stamford, Conn.

[21] Appl. No.: 15,530

[22] Filed: Feb. 23, 1979

[51] Int. Cl.[2] .................... H02M 5/458; H05B 41/36

[52] U.S. Cl. .................................... 363/49; 363/97; 363/37; 315/205; 315/220; 315/224; 315/DIG. 5; 315/DIG. 7; 331/113 A

[58] Field of Search ......................... 363/49, 97, 37; 315/205, 209, 220, 224, 255, DIG. 5, DIG. 7; 331/113 A

[56] References Cited

U.S. PATENT DOCUMENTS

| | | | |
|---|---|---|---|
| 4,104,715 | 8/1978 | Lawson | 363/37 |
| 4,109,307 | 8/1978 | Knoll | 315/205 X |
| 4,127,795 | 11/1978 | Knoll | 363/37 X |
| 4,127,893 | 11/1978 | Goepel | 363/37 |

*Primary Examiner*—Alfred E. Smith
*Assistant Examiner*—Charles F. Roberts
*Attorney, Agent, or Firm*—T. H. Buffton

[57] ABSTRACT

An electronic ballast circuit includes a direct drive high frequency inverter circuit with a tuned output circuit and a drive circuit dependent upon current flow in a load circuit. The high frequency inverter circuit is coupled to a DC potential source which is derived from a pulsed DC potential source by way of a charge storage and charge isolating circuit. An oscillator provides a starting capability for the high frequency inverter circuit and is essentially removed from the active circuitry upon energization of the high frequency inverter circuit.

9 Claims, 1 Drawing Figure

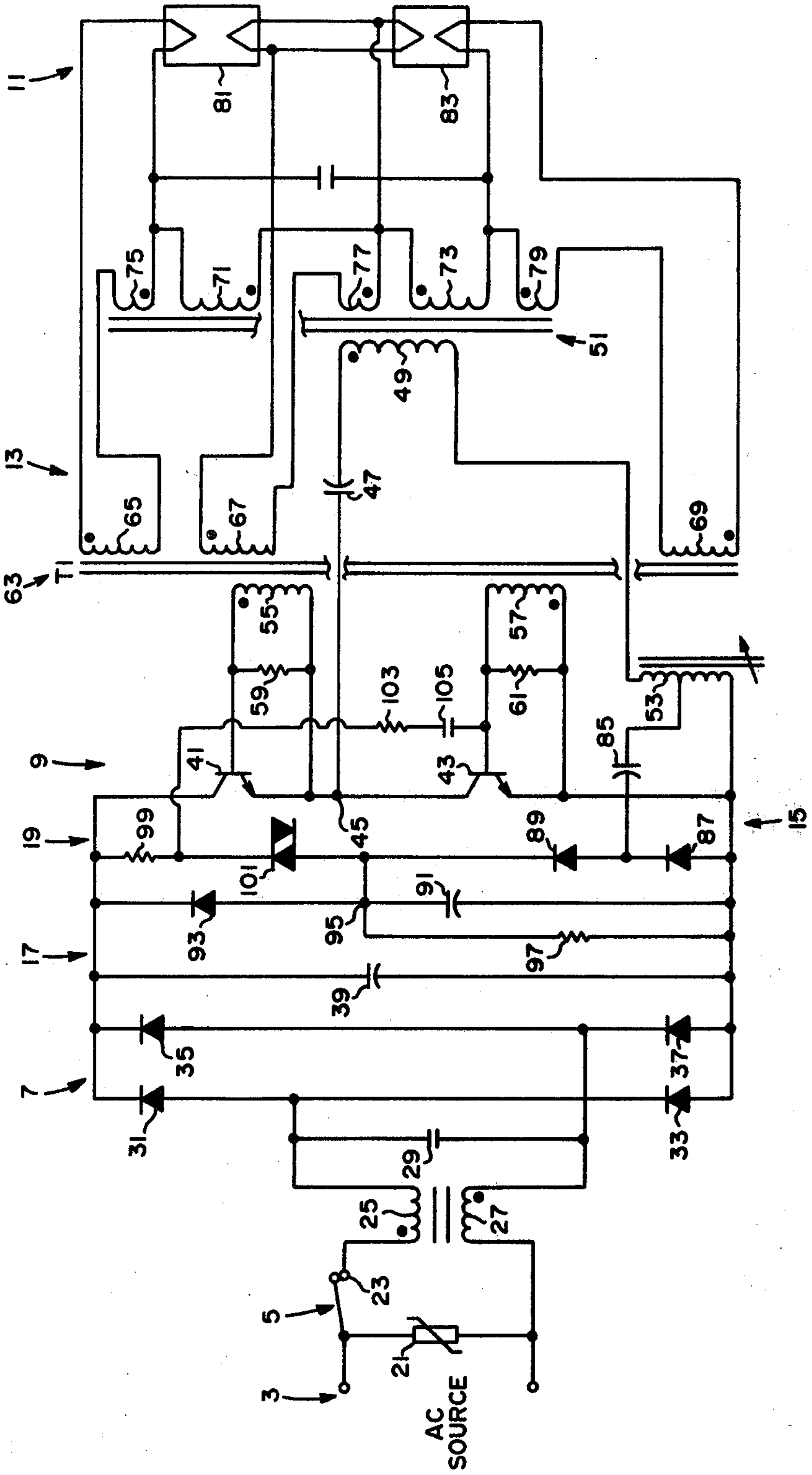
11
81
83
75
71
77
73
79
51
49
13
47
65
67
69
63
T1
55
57
59
103
105
61
53
85
9
41
43
45
19
99
101
89
87
15
91
93
95
17
97
39
35
37
7
31
33
29
25
27
23
5
21
3
AC SOURCE

DIRECT DRIVE BALLAST WITH STARTING CIRCUIT

CROSS-REFERENCE TO OTHER APPLICATIONS

A pending application entitled "Direct Drive Ballast Circuit" bearing U.S. Ser. No. 908,044 and filed Mar. 22, 1978 in the name of William C. Knoll and assigned to the Assignee of the present appliction includes an oscillator-type starting circuit for a high frequency inverter circuit.

TECHNICAL FIELD

This invention relates to ballast circuitry for fluorescent lamp loads and more particularly to directly driven ballast circuitry wherein a high frequency inverter dependent upon current flow in a load circuit is energized by a relaxation-type oscillator starting circuit.

BACKGROUND OF THE INVENTION

Ballast circuitry for a great many fluorescent lamp systems is of the auto-transformer type which is undesirably heavy, cumbersome, and expensive as compared with most electronic-type circuitry. Moreover, auto-transformer type ballast circuitry tends to be relatively inefficient of energy causing undesired heating which is obviously detrimental. Also, such apparatus operates in the audible frequency range which results in undue and undesired noise and is annoying to a user.

As to electronic type ballast circuitry, one form of such circuitry is set forth in U.S. Pat. No. 4,109,307. Therein, a charge storage and charge storage isolating capability is provided in apparatus which includes a high frequency inverter circuit. However, the high frequency inverter circuit is independent of unexpected load changes which is a less than satisfactory operational condition.

In another known form of electronic ballast circuitry, the high frequency inverter circuit is load dependent which enhances the operational capability. However, the drive system for the high frequency inverter circuit is relatively complex which, in turn, undesirably increases the component and assembly costs. Moreover, circuit complexity is usually in diametric opposition to enhanced reliability.

In still another form of electronic ballast circuitry, a load dependent high frequency inverter is utilized in conjunction with a charge storage and charge storage isolating circuit. Moreover, the high frequency inverter drive circuitry is relatively uncomplicated and a starting circuit initiates operation of the high frequency inverter. However, the starting circuit requires an amplifier system which adds complexity and expense to the apparatus.

SUMMARY OF THE INVENTION

In one aspect of the present invention, an improved direct drive electronic ballast circuit includes a high frequency inverter circuit coupled to a pulsating DC potential source connected to an AC potential source. The high frequency inverter circuit is coupled to a load and the load is coupled by a drive circuit to the high frequency inverter circuit. A charge storage and charge storage isolating circuit shunts the high voltage rectifier and is coupled to a feedback rectifier circuit and to the high frequency inverter circuit. Moreover, an improved starting circuit for the high frequency inverter includes a voltage breakdown device coupling the rectifier circuit to the charge storage and isolating circuit, the feedback rectifier circuit, and AC coupled to the high frequency inverter circuit.

BRIEF DESCRIPTION OF THE DRAWINGS

The sole FIGURE is a schematic illustration of a direct drive ballast circuit having the improved starting circuit of the invention.

PREFERRED EMBODIMENT OF THE INVENTION

For a better understanding of the present invention, together with other and further objects, advantages and capabilities thereof, reference is made to the following disclosure and appended claims in conjunction with the accompanying drawing.

Referring to the drawing, a preferred form of direct drive ballast circuitry suitable for use with a lamp load includes an AC potential source 3 coupled by a line conditioner circuit 5 to a rectifier circuit 7 for providing a pulsed DC potential. The rectifier circuit 7 is coupled to a high frequency inverter circuit 9 which is, in turn, coupled to a lamp load circuit 11. The load circuit 11 is directly connected to a high frequency inverter drive circuit 13 coupled to the high frequency inverter circuit 9.

A feedback rectifier circuit 15 in series connection with the output of the high frequency inverter circuit 9 provides energy to a charge storage and charge isolating circuit 17 shunting the rectifier circuit 7. A starting oscillator circuit 19 is directly coupled to the rectifier circuit 7, the charge storage and charge isolating circuit 17, and the feedback rectifier circuit 15. Also, the starting oscillator circuit 19 is AC coupled to the high frequency inverter circuit 9.

More specifically, the line conditioner circuit 5 includes a transient suppressor 21, which may be in the form of a metal oxide varistor or back-to-back transistors for example, shunting the AC source 3. One side of the AC source 3 line is coupled via an overload switch 23 to a first inductor 25 while the other side of the AC source line is coupled to a second inductor 27. Both the first and second inductors 25 and 27 are preferably affixed to the same core to maximize the mutual inductance therebetween. Also, a capacitor 29 is coupled across the first and second inductors 25 and 27.

The rectifier circuit 7 is preferably in the form of a full-wave bridge-type rectifier. Specifically, the rectifier circuit 7 has a first pair of diodes 31 and 33 connected to one line and a second pair of diodes 35 and 37 connected to the opposite line of the line conditioner circuit 5. A filter capacitor 39 is shunted across the diodes 35 and 37.

Connected to the rectifier circuit 7 is the high frequency inverter circuit 9 which includes a pair of series connected substantially identical transistors 41 and 43 shunting the rectifier circuit 7. The junction 45 of the series connected transistors 41 and 43 is coupled to a series resonant circuit including a capacitor 47 and the primary winding 49 of a second transformer 51 as well as to a centertapped inductive winding 53. Also, each of the transistors 41 and 43 has emitter and base electrodes coupled to a drive winding 55 and 57 shunted by a damping resistor 59 and 61 respectively. Moreover, these drive windings 55 and 57 are the secondary windings of a first transformer 63.

The high frequency inverter circuit 9 has a high frequency inverter drive circuit 13 wherein the secondary windings 55 and 57 of the first transformer 63 are energized by the primary windings 65, 67 and 69 respectively which are, in turn, directly connected to a load 11. Therein, the secondary windings 71 and 73 and filament windings 75, 77 and 79 respectively of the first transformer 51 are series connected to a pair of lamps 81 and 83.

Also, a feedback rectifier circuit 15 in the form of a voltage-doubler circuit includes the center-tapped winding 53 in series connection with the primary winding 49 of the second transformer 51. This center-tapped winding 53 is coupled by a capacitor 85 to the junction of a pair of diodes 87 and 89 forming a voltage doubler circuit. Moreover, the center-tapped winding 53 is adjustable in order to control the energy feedback of the system.

Shunting the rectifier circuit 7 and coupled to the voltage-doubler circuit 15 is a charge storage and charge isolating circuit 17. Therein a charge storage capacitor 91 and charge isolating diode 93 are in series connection across the rectifier circuit 7 with the junction 95 therebetween coupled to the diode 89 of the feedback rectifier circuit 15 and to a resistor 97 shunting the capacitor 91.

Additionally, a starting oscillator circuit 19 includes a series connected first impedance 99 and diac 101 connected to the rectifier circuit 7 and to the feedback rectifier circuit 15 as well as to the junction 95 of the charge storage and charge isolating circuit 17. From the junction of the first impedance 99 and diac 101, a second impedance 103 and capacitor 105 are series connected to the transistor 43 of the high frequency inverter circuit 9.

As to operation, a potential from the AC source 3 is filtered by the line conditioner circuit 5. This line conditioner circuit 5 serves as a transient signal filter as well as a radio frequency interference (RFI) filter. Therein, the transient suppressor 21 provides a "clipping" capability for undesired transient signal spikes appearing at the AC source 3. These "clipped" signals are then filtered by the first and second inductors 25 and 27. Moreover, these first and second inductors 25 and 27 acting in conjunction with the capacitor 29 provide an RFI filter capability which inhibits the appearance of such undesired signal features at the rectifier circuit 7. Thus, the potential applied to the rectifier circuit 7 is essentially devoid of undesired transient spikes and RFI signals. Also, capacitor 29, inductors 25 and 27 filter RFI, generated by the high frequency inverter, which prevents RFI from getting out on the AC source.

The rectifier circuit 7 which is in the form of a bridge-Type full-wave rectifier responds to the applied AC potential to provide a pulsating DC potential at a frequency of about 120 Hz. In turn, this pulsating DC potential is altered, in a manner to be explained hereinafter, to provide a relatively steady-state DC potential which is applied to the high frequency inverter circuit 9.

The high frequency inverter circuit 9 is in the form of a chopper or square wave oscillator having a pair of substantially similar transistors 41 and 43 which switch in a push-pull mode. The chopper or oscillator has a series resonant output circuit which includes the capacitor 47 and primary winding 49 of the second transformer 51. This series resonant circuit has a resonant frequency of about 20 KHz, which is well above the audio range and therefore removed from the area of deleterious effect upon the consumer. Also, the series resonant output circuit porvides a low impedance path to current flow therethrough and any such increase in current flow is accompanied by the usual increase in current flow in the secondary windings 71 and 73 of the second transformer 51.

Importantly, increased current flow in the secondary windings 71 and 73 of the load circuit 11 is accompanied by an increased current flow in the primary windings 65, 67 and 69 of the first transformer 63. In turn, the secondary drive windings 55 and 57 provide increased base drive for the series connected transistors 41 and 43 of the high frequency inverter circuit 9. Thus, the high frequency inverter circuit 9 not only derives drive potentials from the series resonant loop of capacitor 47 and inductor 49 but is also dependent upon and driven by current flowing in the load circuit 11.

Also, increased current flow in the resonant circuit including the winding 49 is accompanied by an increased current flow in the inductive winding 53. This increased current flow in the inductive winding 53 is rectified by the voltage doubler circuit, including diodes 87 and 89, and applied to the charge storage capacitor 91 of the charge storage and charge isolating circuit 17. Therein, the charge storage capacitor 91 serves to store energy while the charge isolating diode 93 isolates the capacitor 91 from the pulsating DC potential source 7 so long as the pulsating DC potential remains greater than a given reference level. However, when the pulsating DC potential does decrease below the given reference level, energy is supplied from the storage capacitor 91 via the diode 93 to the rectifier circuit 7 whereby a relatively steady state DC potential is provided for the high frequency inverter circuit 9.

Further, it has been found that the switching capability of the transistors of a high frequency inverter circuit is enhanced when driven directly from a transformer rather than through a complex base biasing arrangement. However, it has also been found that the high frequency inverter circuit 9 would not self-start when a direct drive system was employed. Moreover, it was also found that minimizing the component count of the starting circuit would reduce costs, facilitate mechanized assembly and increase the reliability factor of the circuit.

As to operation of the starting circuit 19, there is no energy feedback to the charge storage capacitor 91 prior to operation of the high frequency inverter circuit 9. However, the AC source 3 provides energy which causes development of a relatively high voltage across the capacitor 39.

This relatively high voltage, developed at the capacitor 39, causes development of an increasing charge on the capacitor 105 of the oscillator starting circuit 19 via the first and second impedances 99 and 103 and the winding 57 of the first transformer 63. Moreover, the high frequency inverter circuit 9 has not yet started to oscillate and no charge is present on the charge storage capacitor 91 of the charge storage and charge isolating circuit 17.

When the voltage at the capacitor 105 exceeds the breakover voltage of the diac 101, the capacitor 105 discharges through the impedance 103, the diac 101, the capacitor 91 and the winding 57 of the first transformer 63. The transformer 63 transmits this discharge current appearing at the winding 57 to the emitter-base junction of the transistor 41 of the high frequency inverter circuit 9, biasing the transistor 41 on and starting the oscillator of the high frequency inverter circuit 9. Thereupon, the high frequency inverter circuit 9 charges the charge storage capacitor 91. Thus, the charge on the capacitor 91 is sufficient to prevent the voltage across the isolating diode 93 from reaching a value sufficient to effect breakover of the diac 101. As a result, the starting circuit 19 is, for all practical purposes, removed from the operational circuitry upon accomplishment of the task of starting the high frequency inverter circuit 9.

INDUSTRIAL APPLICABILITY

Thus, there has been provided a direct drive electronic ballast circuit having an enhanced starting circuit capability. The ballast circuit is also load dependent whereby alteration in the load causes an immediate effect upon the operation of the apparatus and prevents development of undesired high currents and destruction of the components of the apparatus. Moreover, the enhanced starting circuit is inexpensive, reliable and improves the assembly of the apparatus.

While there has been shown and described what is at present considered the preferred embodiment of the invention, it will be obvious to those skilled in the art that various changes and modifications may be made therein without departing from the invention as defined by the appended claims.

We claim:

1. In a direct drive ballast circuit coupled to an AC potential source and having a rectifier circuit means providing a pulsating DC potential to a high frequency inverter circuit coupled to a load circuit with a high frequency inverter drive circuit coupling the load circuit to the high frequency inverter and a charge storage and isolating circuit shunting the rectifier circuit means and coupled to a feedback rectifier means connected to the high frequency inverter circuit means, the improvement comprising an oscilator starter circuit means directly coupled to said rectifier circuit means, said feedback rectifier circuit means, and to said charge storage and isolating circuit and AC coupled to said high frequency inverter circuit means.

2. The direct drive ballast circuit of claim 1 wherein said oscillator starter circuit includes a diac directly coupled to said rectifier circuit means, said feedback rectifier circuit means, and said charge storage and isolating circuit and AC coupled to said high frequency inverter circuit.

3. The direct drive ballast circuit of claim 1 wherein said oscillator starter circuit includes a series connected diac and impedance coupled to said rectifier circuit means and to the junction of said feedback rectifier circuit means and said charge storage and isolating circuit means.

4. The direct ballast circuit of claim 1 wherein said oscillator starter circuit includes a series connected diac and impedance with a capacitor coupling the junction of said series connected diac and impedance to said high frequency inverter circuit.

5. In a direct drive ballast circuit coupled to source of AC potential and having means for rectifying the AC potential to provide a pulsating DC potential source, a high frequency inverter means coupled to the pulsating DC potential source and to a load circuit means with a means for driving the high frequency inverter coupling the load circuit means to the high frequency inverter means and means for storing a charge and isolating the stored charge shunting the means for rectifying the AC potential source and coupled to a feedback rectifier means connected to the high frequency inverter means, the improvement comprising starting oscillator circuit means directly connected to the means for rectifying the AC potential, to the feedback rectifier means, to the means for storing a charge and isolating the stored charge, and AC coupled to the high frequency inverter means whereby a starter circuit responds to an AC source to activate a frequency inverter and energize a load circuit.

6. The improvement of claim 5 wherein said starting oscillator circuit means includes a voltage breakdown device directly coupled to said means for rectifying the AC potential, to said feedback rectifier means, to said means for storing a charge and isolating the stored charge and AC coupled to said high frequency inverter means.

7. The improvement of claim 5 wherein said starting oscillator circuit means includes a diac directly coupling said means for rectifying the AC potential to said feedback rectifier means and to said means for storing a charge and isolating the stored charge and AC coupled to said high frequency inverter means.

8. The improvement of claim 5 wherein said starting oscillator circuit means includes a diac directly coupling said means for rectifying the AC potential to said feedback rectifier means and to said means for storing a charge and isolating the stored charge and a capacitor coupling the junction of the means for rectifying the AC potential and the diac to said high frequency inverter means.

9. The improvement of claim 5 wherein said starting oscillator circuit includes a series connected first impedance and diac connected to said means for rectifying said AC potential and to the junction of said means for storing a charge and isolating the stored charge and to said feedback rectifier means and a series connected second impedance and capacitor coupling the junction of said first impedance and diac to said high frequency inverter means.

* * * * *